US007707634B2

(12) United States Patent
Sandu et al.

(10) Patent No.: US 7,707,634 B2
(45) Date of Patent: Apr. 27, 2010

(54) SYSTEM AND METHOD FOR DETECTING MALWARE IN EXECUTABLE SCRIPTS ACCORDING TO ITS FUNCTIONALITY

(75) Inventors: Catalin D. Sandu, Redmond, WA (US); Adrian M. Marinescu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1032 days.

(21) Appl. No.: 10/769,104

(22) Filed: Jan. 30, 2004

(65) Prior Publication Data

US 2005/0172338 A1 Aug. 4, 2005

(51) Int. Cl.
*G06F 11/00* (2006.01)
(52) U.S. Cl. .............................. 726/24; 726/22; 726/23; 726/25
(58) Field of Classification Search .............. 726/22–25
See application file for complete search history.

(56) References Cited

U.S. PATENT DOCUMENTS

| 6,205,551 | B1* | 3/2001 | Grosse ........................ 726/25 |
| 6,230,288 | B1* | 5/2001 | Kuo et al. .................... 714/38 |
| 6,792,543 | B2* | 9/2004 | Pak et al. ...................... 726/24 |
| 7,093,239 | B1* | 8/2006 | van der Made ............. 717/135 |
| 7,152,164 | B1* | 12/2006 | Loukas ........................ 713/188 |
| 7,167,988 | B2* | 1/2007 | Hayashi ...................... 713/187 |
| 7,188,369 | B2* | 3/2007 | Ho et al. ...................... 726/24 |
| 7,243,371 | B1* | 7/2007 | Kasper et al. ................ 726/22 |
| 7,398,553 | B1* | 7/2008 | Li ................................ 726/22 |
| 2002/0073330 | A1* | 6/2002 | Chandnani et al. .......... 713/200 |
| 2003/0074573 | A1* | 4/2003 | Hursey et al. ................ 713/200 |
| 2003/0188189 | A1* | 10/2003 | Desai et al. .................. 713/201 |
| 2004/0064737 | A1* | 4/2004 | Milliken et al. ............. 713/201 |
| 2004/0181685 | A1* | 9/2004 | Marwaha ..................... 713/201 |

OTHER PUBLICATIONS

Schultz et al, data mining method for detection of new malicious executables, May 14-16, 2001, IEEE, p. 38-49.*
James et al, computer security: Neutralizing windows-base malicious mobile, Mar. 2002, ACM, p. 242-246.*

* cited by examiner

*Primary Examiner*—Kambiz Zand
*Assistant Examiner*—Teshome Hailu
(74) *Attorney, Agent, or Firm*—Workman Nydegger

(57) ABSTRACT

A malware detection system and method for determining whether an executable script is malware is presented. The malware detection system determines whether the executable script is malware by comparing the functional contents of the executable script to the functional contents of known malware. In practice, the executable script is obtained. The executable script is normalized, thereby generating a script signature corresponding to the functionality of the executable script. The script signature is compared to known malware script signatures in a malware signature store to determine whether the executable script is malware. If a complete match is made, the executable script is considered to be malware. If a partial match is made, the executable script is considered to likely be malware. The malware detection system may perform two normalizations, each normalization generating a script signature which is compared to similarly normalized known malware script signatures in the malware signature store.

14 Claims, 15 Drawing Sheets

```
dim vPath,vNames,vPaths,scriptPath,vBaseName,objArgs,remove,quiet,I
' get current path to folder
vPath = left(Wscript.ScriptFullName,len(Wscript.ScriptFullName ) - len(Wscript.ScriptName))
vNames = Array("LoanWebService")    ' Names of webs to create
vBaseName = myGetBaseName("NetSDK")
remove = False
quiet = False
vPaths = Array( vPath )
Set objArgs = WScript.Arguments
For I = 0 To objArgs.Count - 1
    If InStr(LCase(objArgs(I)), "u") <> 0 Then
        remove = True
    End If
    If InStr(LCase(objArgs(I)), "q") <> 0 Then
        quiet = True
    End If
Next
If remove Then
    'call to delete vDir
    DeleteVDir vNames, vBaseName
End If
```

*Fig. 6.*

```
V0 = left ( wscript . scriptfullname , len ( wscript . scriptfullname ) - len ( wscript . scriptname ) )

V1 = array ("loanwebservice")

V2 = RO ("netsdk")
V3 = false
V4 = false set V5 = wscript . arguments
for V6 = 0 to V5 . count -1
    if instr ( lcase ( V5 ( V6 ) ) "u" ) <> 0 then
        V3 = true
    end if
    if instr ( lcase ( V5 ( V6 ) ) "q" ) <> 0 then
        V4 = true
    end if
next
• • •
```

*Fig. 7.*

```
[V] left wscript scriptfullname [len] wscript scriptname
V array
V array V
[V R]
V
set V wscript arguments
for V to V count
if instr lcase V V then
V
endif
if instr lcase V V then
V
endif
next
• • •
```

*Fig.11.*

SYSTEM AND METHOD FOR DETECTING MALWARE IN EXECUTABLE SCRIPTS ACCORDING TO ITS FUNCTIONALITY

FIELD OF THE INVENTION

The present invention relates to a system and method for proactively securing a computer against malware, and in particular, a system and method for proactively securing a computer against malware by detecting malware in an executable script according to its functionality.

BACKGROUND OF THE INVENTION

As more and more computers are interconnected through various networks, such as the Internet, computer security also becomes increasingly more important. In particular, computer security in regard to external attacks from malware has become, and continues to become, increasingly more important. Malware, for purposes of the present discussion, is defined as unwanted computer attacks. Those skilled in the art will appreciate that malware includes, but is not limited to, computer viruses, Trojan horses, worms, denial of service attacks, abuse/misuse of legitimate computer system functions, and the like. The primary defense against malware is anti-virus software.

FIGS. 1A and 1B are pictorial diagrams illustrating how anti-virus software currently operates. In particular, FIG. 1A illustrates how anti-virus software detects known malware and prevents the known malware from reaching and infecting a computer. Alternatively, FIG. 1B illustrates a common weakness of anti-virus software, particularly how anti-virus software is unable to detect and prevent modified malware from reaching and infecting a computer. What is meant by "reaching" the computer is getting past the anti-virus software. Those skilled in the art will readily recognize anti-virus software almost always resides on the computer it is protecting, and operates on incoming data as it physically arrives at the computer. Thus, while incoming data, including malware, may be located at the computer, for purposes of the present invention, the incoming data does not actually "reach" the computer until it gets past the anti-virus software.

As shown in FIG. 1A, malware 102 is directed over a network 106 to the computer 110, as indicated by arrow 108. Those skilled in the art will appreciate that the malware 102 may be directed to the computer 110 as a result of a request from the computer, or directed to the computer from another network device. However, before the known malware 102 infects the computer 110, anti-virus software 104, which is typically installed on the computer 110, intercepts the malware and examines it. The anti-virus software scans the incoming data (malware) as a file, searching for identifiable patterns, also referred to a signatures, associated with known malware. If a malware signature is located in the file, the anti-virus software 104 takes appropriate action, such as deleting the known malware/infected file, or removing the malware from an infected file, sometimes referred to as cleaning the file. In this manner, anti-virus software 104 is able to prevent the known malware 102 from reaching and infecting the computer 110, as indicated by the arrow 112.

Those skilled in the art will appreciate that almost all unknown malware are actually rewrites or reorganizations of previously released malware. Indeed, encountering an absolutely novel malware is relatively rare, as most "new" malware are actually rewrites or rehashes of existing malware. Malware source code is readily available and it is a simple task for a malicious party to change variable names, reorder lines of code, or somehow superficially modify the malware. This is especially true with script-based malware, as scripts are essentially text files that are interpreted by a script processor/interpreter on a host computer.

The end result of rehashing or rewriting an existing malware is that the static appearance of the malware is superficially altered while the functionality of the malware typically remains the same. Unfortunately, current anti-virus software operates only on the static signatures of known malware. Thus "new" malware, while it may functionally identical to its "parent" malware, is not detected nor stopped by current anti-virus software 104 due to the pattern matching system of the anti-virus software.

FIG. 1B is a pictorial diagram illustrating how current anti-virus software is unable to prevent a modified malware from reaching a computer. As shown in FIG. 1B, known malware 102 undergoes a modification process 114, such as a rehash or rewrite, resulting in modified malware 116. As mentioned above, the modified malware 116 will most likely have a different static appearance, though its functionality may be the same. As mentioned above, because the static appearance is modified, the modified malware 116 is not a "known" malware to the anti-virus software 104.

The modified malware 116 is directed through the network 106 to the computer 110, as indicated by arrow 118. As described above, the anti-virus software 104 attempts to identify the modified malware 116 to determine whether it is known malware and should be stopped. As the modified malware 116 is, as yet, an unknown modification, and because the signature of the modified malware is not the same as the original malware 102, the anti-virus software 104 fails to identify the modified malware 116 as malware, and permits it to proceed to the computer 110, as indicated by arrow 120. Upon reaching the computer 110, the modified malware 116 is able to perform its destructive purpose. It is only after an anti-virus software provider identifies a signature pattern for the modified malware 116 and then updates the anti-virus software 104, that the anti-virus software 104 is able to protect the computer 110 from the modified malware 116.

Constantly evaluating unknown malware to identify a static signature and then updating anti-virus software with the new signature is a costly process. It is also inefficient, especially when considering that the modified malware 116 is only superficially modified from its parent, i.e., the known malware 102. It would be helpful if the malware could be identified, not just by its static signature, but also by its functionality. However, currently the only way to evaluate the functionality of malware is to permit it to execute on a computer 110. Of course, this is entirely unacceptable as the ill effects of the malware would run its course on the computer.

In light of the above-identified problems, what is needed is a system and method for evaluating the functionality of an executable script to determine whether the executable script is malware without actually executing the script on the computer. The system and method should also operate in addition to, or separately from, current anti-virus software to protect a computer against rewritten or reorganized malware scripts. The present invention addresses this and other issues found in the prior art.

SUMMARY OF THE INVENTION

In accordance with the present invention, a malware detection system for determining whether an executable script is malware according to its functionality is presented. The malware detection system includes a malware signature store. The malware signature store includes at least one script signature of known malware scripts. The malware detection system also includes a normalization module. The normalization module obtains an executable script and normalizes it, thereby generating a script signature for the executable script. After normalizing the executable script, the malware detection system compares the script signature corresponding to the executable script to the script signatures in the malware signature store, and accordingly determines whether the executable script is malware.

In further accordance with the present invention, a malware detection system for determining whether an executable script is malware according to its functionality is presented. The malware detection system comprises a malware signature storage means that stores at least one known malware script signature. The malware detection system also comprises a normalization means. The normalization means obtains an executable script and normalizes it, thereby generating a script signature for the executable script. A script signature comprises the normalized functional contents of an executable script in a format that may be compared to the normalized functional contents of other executable scripts. The malware detection system further includes a comparison means. The comparison means compares the script signature for the executable script to the at least one script signature in the malware signature storage means. According to the comparison performed by the comparison means, the malware detection system determines whether the executable script is malware.

In yet further accordance with the present invention, a method for determining whether an executable script is a malware script is presented. According to the method, an executable script is obtained. The obtained executable script is normalized, thereby generating a first script signature. A script signature comprises the normalized functional contents of an executable script in a format that may be compared to the normalized functional contents of other executable scripts. The first script signature is compared to at least one script signature of known malware scripts. Based on the comparison, a determination is made as to whether the executable script is a malware script.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a block diagram illustrating an exemplary subroutine segment from an executable script for evaluation by the malware detection system;

FIG. 7 is a block diagram illustrating the exemplary output of the first normalization of the exemplary subroutine segment illustrated in FIG. 6;

FIG. 11 is a block diagram illustrating the exemplary output of the second normalization of the normalized subroutine segment described in regard to FIG. 7.

DETAILED DESCRIPTION

Figure 1A:
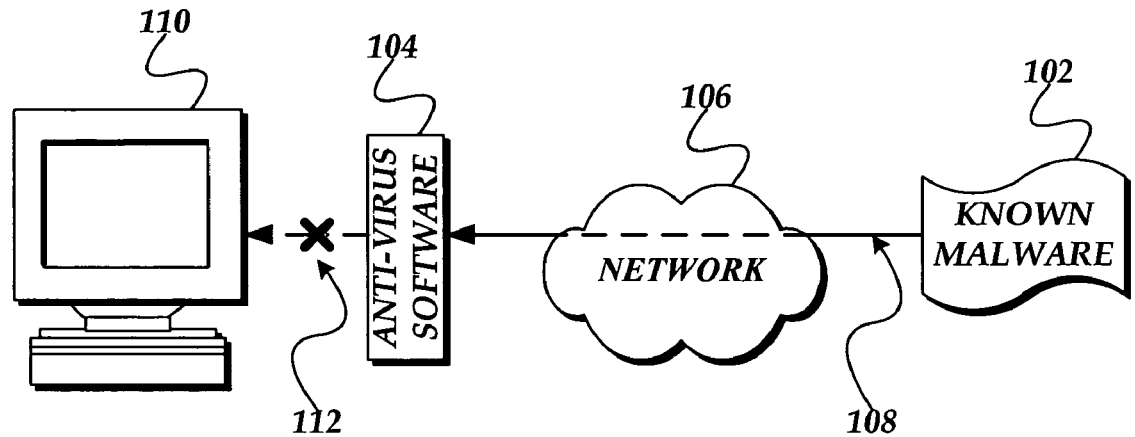
FIG. 1A is a pictorial diagram illustrating how current anti-virus software detects known malware and prevents it from reaching and infecting a computer.
Figure 1B:
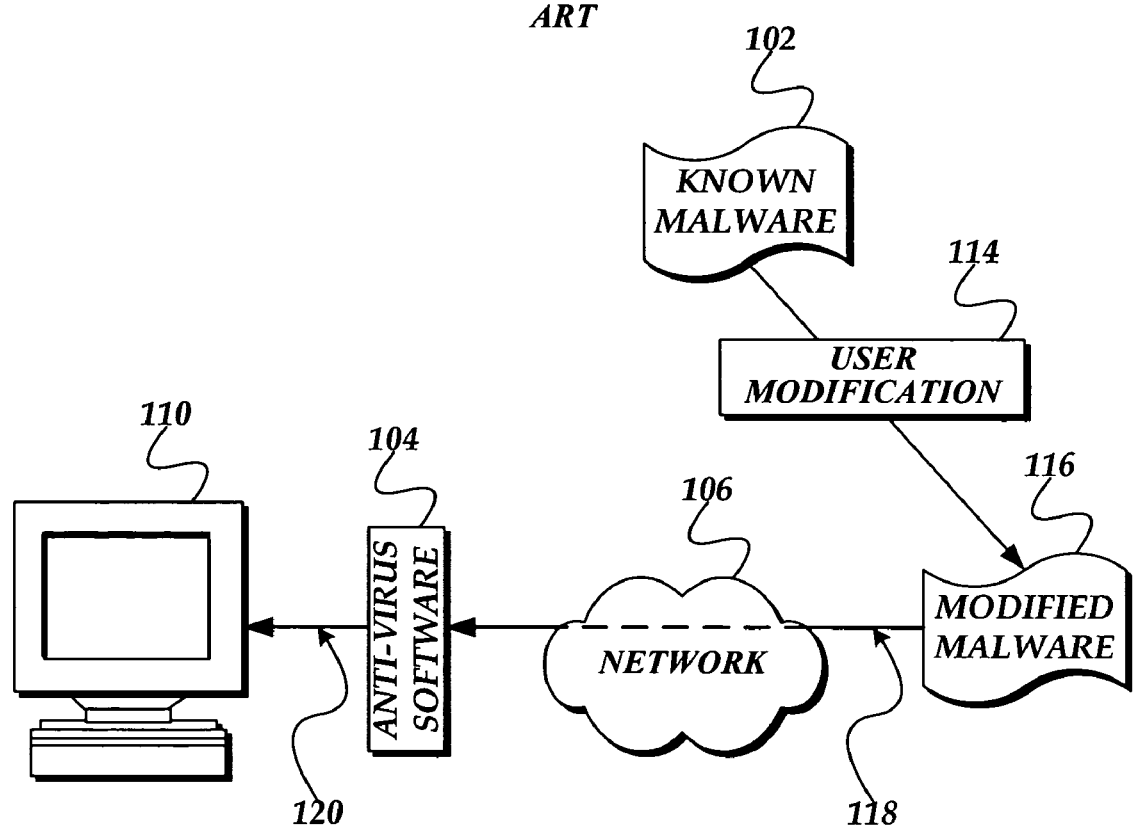
FIG. 1B is a pictorial diagram illustrating how current anti-virus software is unable to prevent modified malware from reaching the computer.
Figure 2:
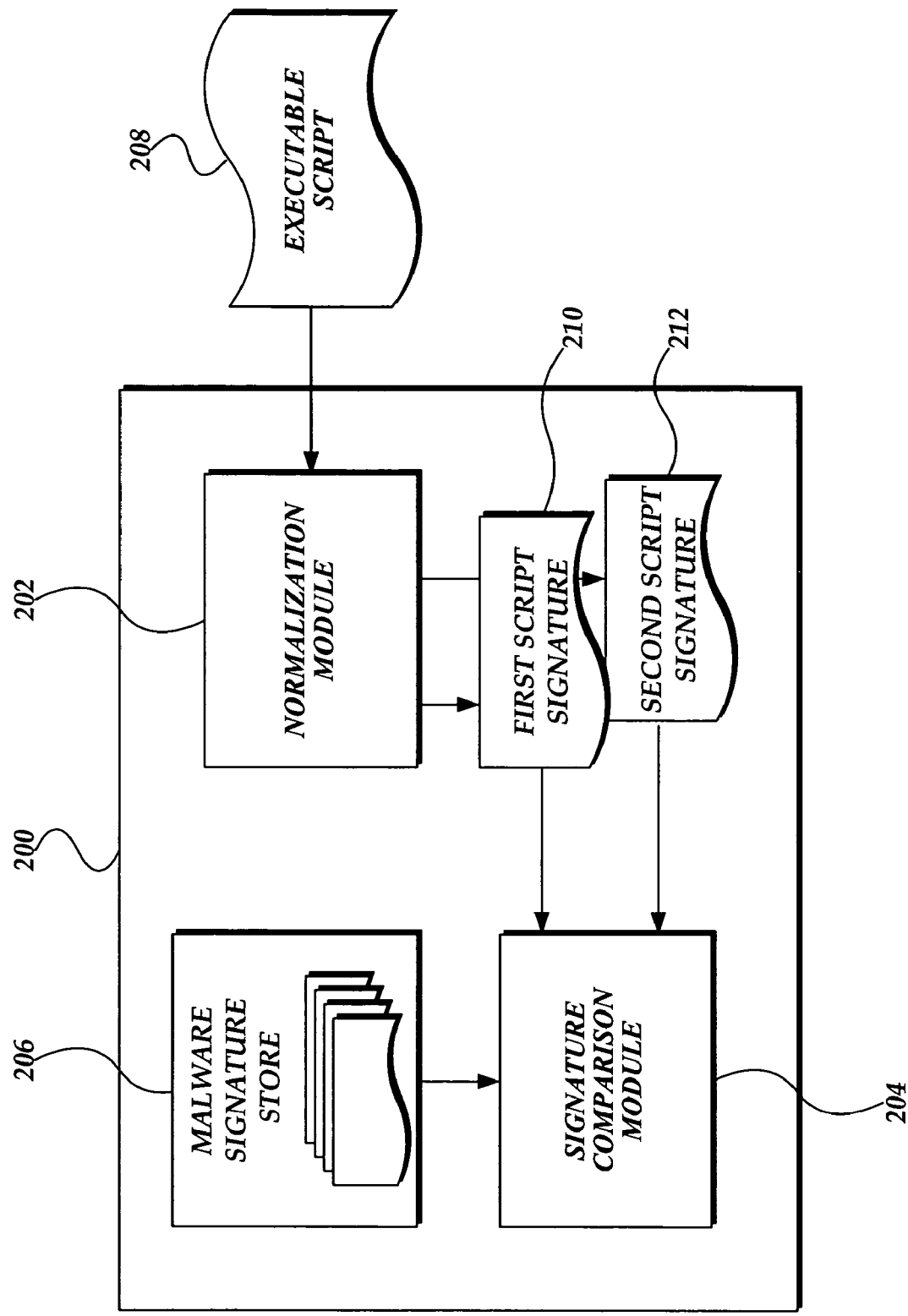
FIG. 2 is a block diagram illustrating an exemplary malware detection system for evaluating whether an executable script is malware according to the executable script's functionality.

FIG. 2 is a block diagram of a malware detection system for determining whether an executable script is malware according to its functionality. It should be noted that the malware detection system described herein does not necessarily replace current available anti-virus software. As mentioned above, current anti-virus software performs a static analysis of a file by scanning the file as a whole for known malware signatures, i.e., patterns in the file's organization. In contrast, the malware detection system of the present invention performs an evaluation based on the functionality of the malware script, i.e., what the malware does. Thus, while the malware detection system set forth in the present invention may be beneficially used as a standalone product to protect a computer from malware, it may also be used in conjunction with current anti-virus software. In fact, current anti-virus software may be more efficient in detecting known malware using its current static signature matching system described above. If so, when the present invention is used in combination with anti-virus software, it may be beneficial to use the anti-virus software's signature matching techniques as a first step in securing a computer from malware before turning to the malware detection system described herein.

It should be further noted that the malware detection system of the present invention need not be implemented on the same machine as anti-virus software or on the computer for which protection is sought. Instead, the malware detection system may be implemented on a third computing device, such as a firewall computer. Additionally, the malware detection system need not be running on the same type of computing device as the target, protected computer.

With reference to FIG. 2, the malware detection system 200 includes a normalization module 202, a signature comparison module 204, and a malware signature store 206. In operation, the malware detection system 200 obtains an executable script 208 for the purpose of determining whether the executable script is malware. The malware detection system delivers the executable script to a normalization module 202 where the executable script is normalized. What is meant by "normalizing" the executable script 208 is to translate the functional contents of the executable script 208 into a common, "normal" format, referred to as a script signature. A script signature corresponding to the executable script, because it is in a normalized form, can be compared to other normalized script signatures of known malware stored in a malware signature store 206.

As routine names, variable names, and the like may be easily modified in a superficial manner, yet functionally remain the same, the present invention looks past the arbitrarily assigned labels in an executable script 208, and instead looks at its functional contents in a normalized form. A normalization module 202 normalizes the executable script 208. A more detailed description of normalizing an executable script, i.e., the process by which an executable script is normalized, is described below. After normalizing an executable script 208, the normalization module 202 outputs a script signature 210, the script signature corresponding to the normalized, functional contents of the executable script. In fact, as will be described in greater detail below, the normalization module 202 performs two normalizations resulting in a first script signature 210 and a second script signature 212.

The signature comparison module 204 takes a script signature, such as script signature 210, and compares it against known malware script signatures stored in the malware signature store 206. As will be described in greater detail below, as a result of comparing a script signature to the known malware script signatures stored in the malware signature store 206, the malware detection system 200 determines whether the executable script 208 is malware.

According to one embodiment of the present invention, the malware detection system performs a single normalization of the executable script and compares the script signature corresponding to the executable script to known malware script signatures. However, according to an alternative embodiment, the malware detection system may perform a second normalization, either on the executable script 208 directly or, alternatively, on the first script signature 210 of the executable script, thereby generating a second script signature 212, which is compared to similarly twice-normalized script signatures of known malware which is also stored in the malware signature store 206.

It should be noted that while the above description of FIG. 2 illustrates various components of the malware detection system 200, particularly the normalization module 202, the signature comparison module 204, and the malware signature store 206, these components should be viewed as logical components and not necessarily actual components. Additionally, those skilled in the art will appreciate a malware detection system 200 may include other components not described herein, and that the logical components of the malware detection system described above may be combined with these other components or, alternatively, subdivided into additional subcomponents. Accordingly, the above-identified organization of a malware detection system 200 should be viewed as illustrative, and should not be viewed as limiting upon the present invention.

Figure 3A:
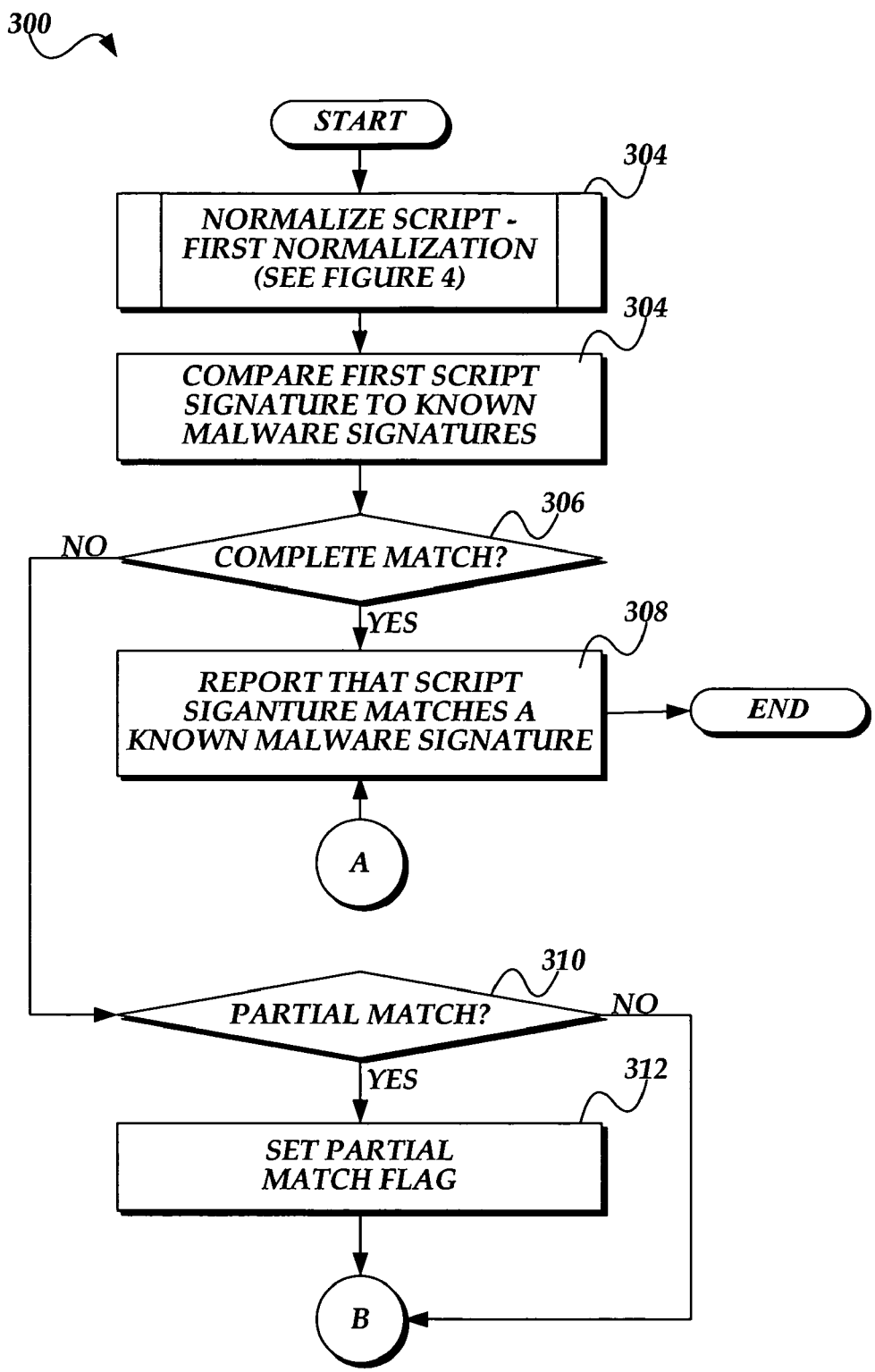
FIGS. 3A and 3B illustrate a flow diagram of an exemplary routine for determining whether an executable script is malware according to its functionality.
Figure 3B:
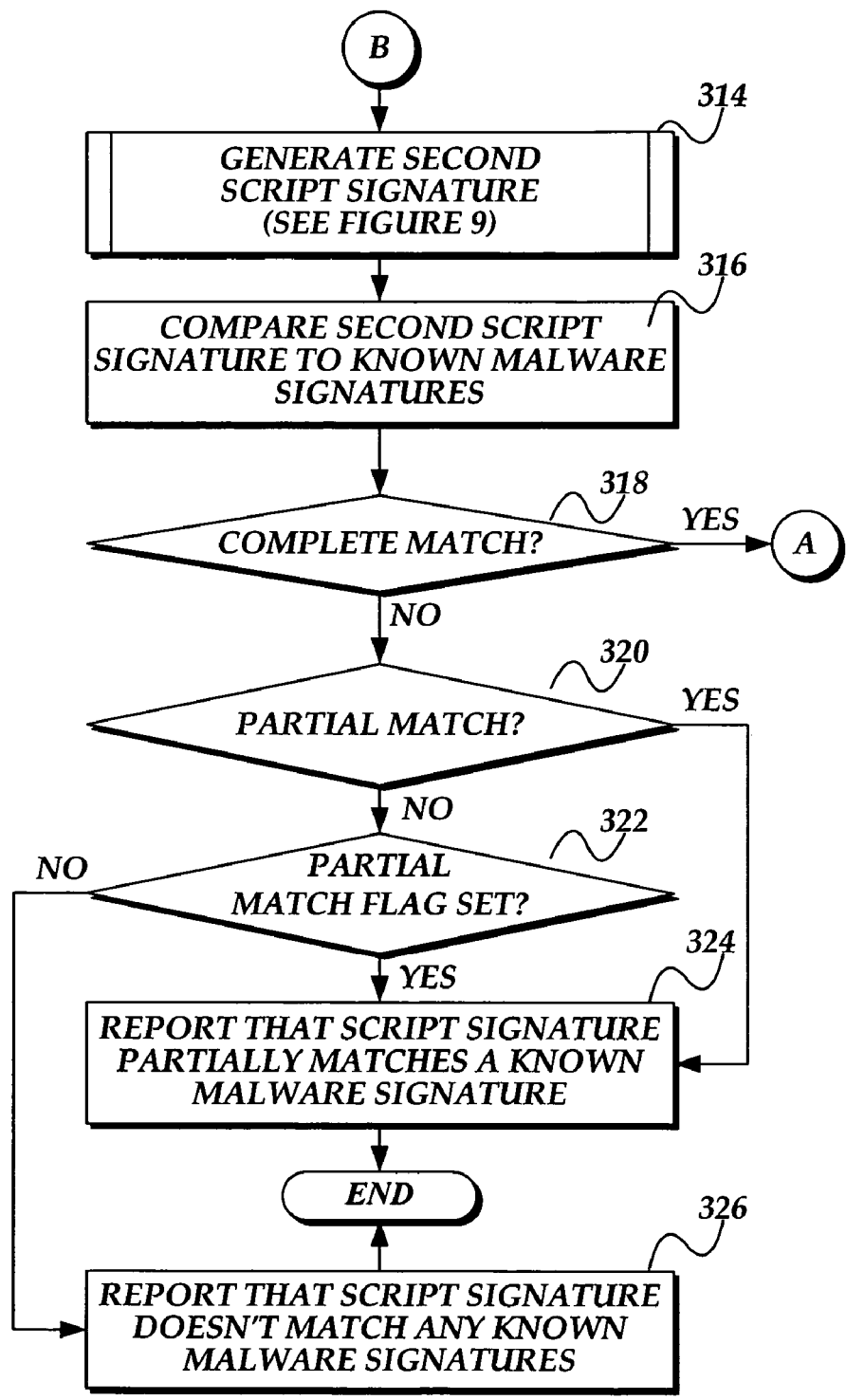

In accordance with the present invention, FIGS. 3A and 3B illustrate a flow diagram of an exemplary routine 300 for determining whether an executable script is malware according to its functionality. Beginning at block 302, the executable script 208 is normalized, this being the first normalization of the executable script. Normalizing an executable script as a first normalization is described in greater detail in regard to FIG. 4.

One mechanism that malicious parties may use to superficially modify an executable script 208 is to simply rearrange the location of the routines within the body of the executable script. Those skilled in the art will recognize that the order in which a script's routines are located in the file is generally irrelevant to its execution. In other words, if the body of a routine is moved from one location in the executable script to another while the contents of the routine remain the same, this movement will have no effect on how the executable script operates during execution. Alternatively, rearranging the contents of a routine can significantly alter how the executable script 208 functions. Thus, in accordance with aspects of the present invention, because the order in which routines appear in the executable script 208 is not important, while the contents of the routines are important, as described below, the executable script is normalized on a routine basis.

Figure 4:
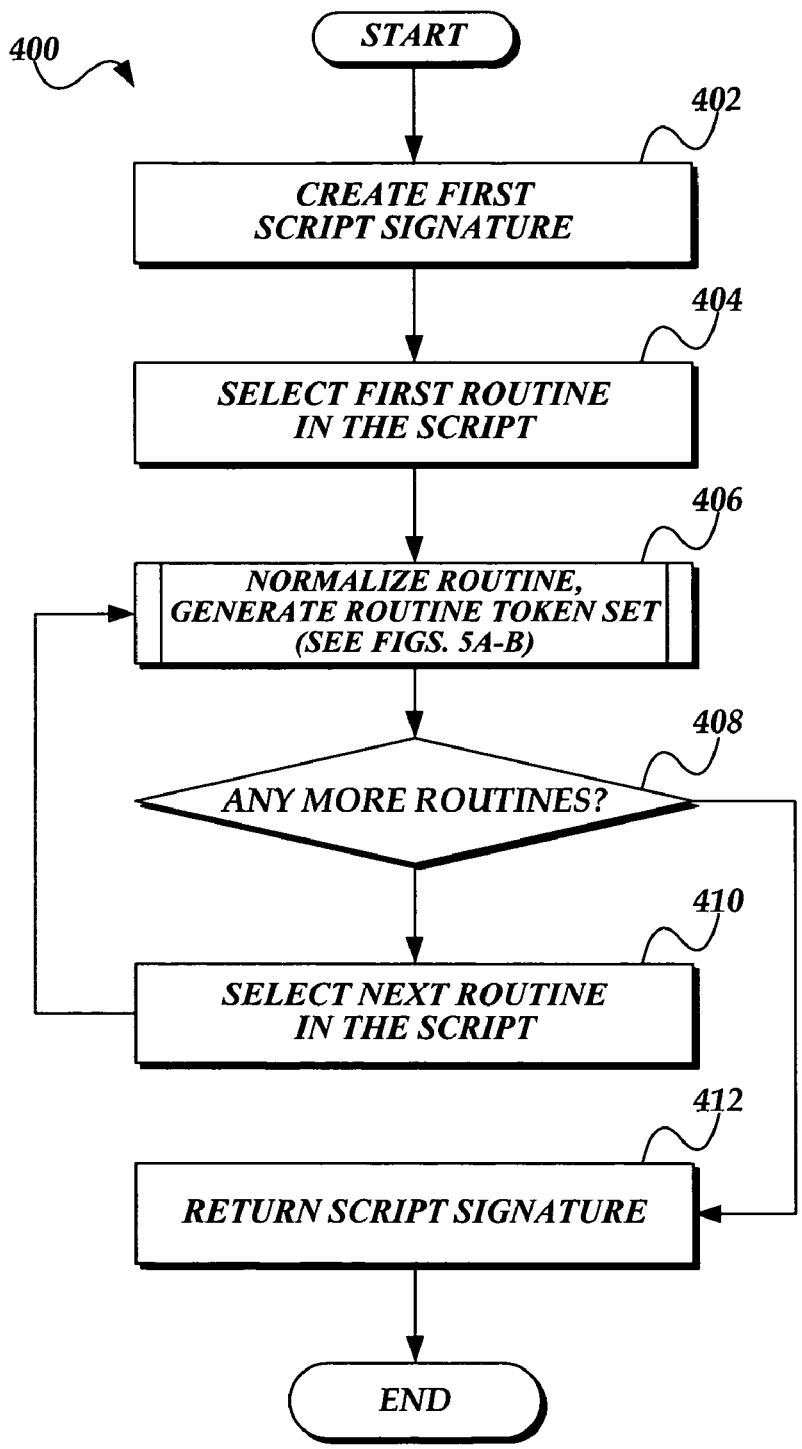
FIG. 4 is a flow diagram illustrating an exemplary routine suitable for use by the exemplary routine of FIGS. 3A and 3B for processing individual script subroutines from an executable script into a normalized format.

FIG. 4 is a flow diagram illustrating an exemplary routine 400, suitable for use by the exemplary routine 300 described above in regard to FIG. 3A, for performing a first normalization on an executable script 208. Beginning at block 402, an empty script signature is created.

Those skilled in the art will recognize that most scripts include a "main" code segment. The main code segment may be located at the start of the script, such as is the case with Visual Basic® script files, or in some other location, often with a label of "main." The main code segment is that body of code from an executable script which is first executed. It should be noted that while this main code segment is often not considered to be a "routine," for purposes of the present invention, the main code segment may be treated as a "routine." Accordingly, at block 404, the first routine in the executable script 208 is selected.

At block 406, the selected routine is normalized a first time, thereby generating a routine token set containing functionality tokens corresponding to the selected routine. Normalizing a selected routine for a first time and generating a routine token set for the selected routine is described below in regard to FIGS. 5A-5C.

Figure 5A:
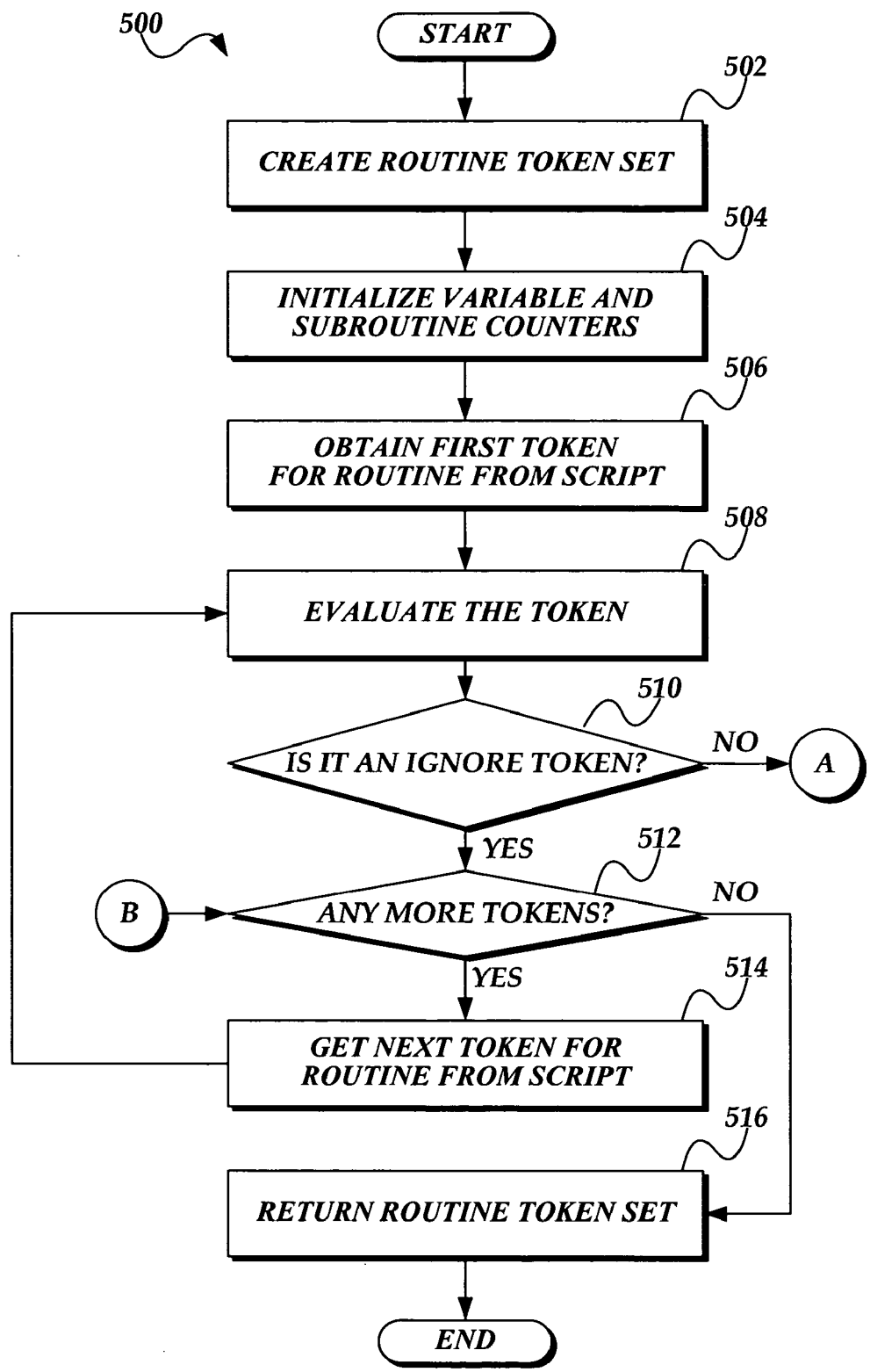
FIGS. 5A, 5B, and 5C illustrate an exemplary flow diagram suitable for use in the exemplary routine of FIG. 4 for performing a first normalization of an executable script's subroutine.
Figure 5B:
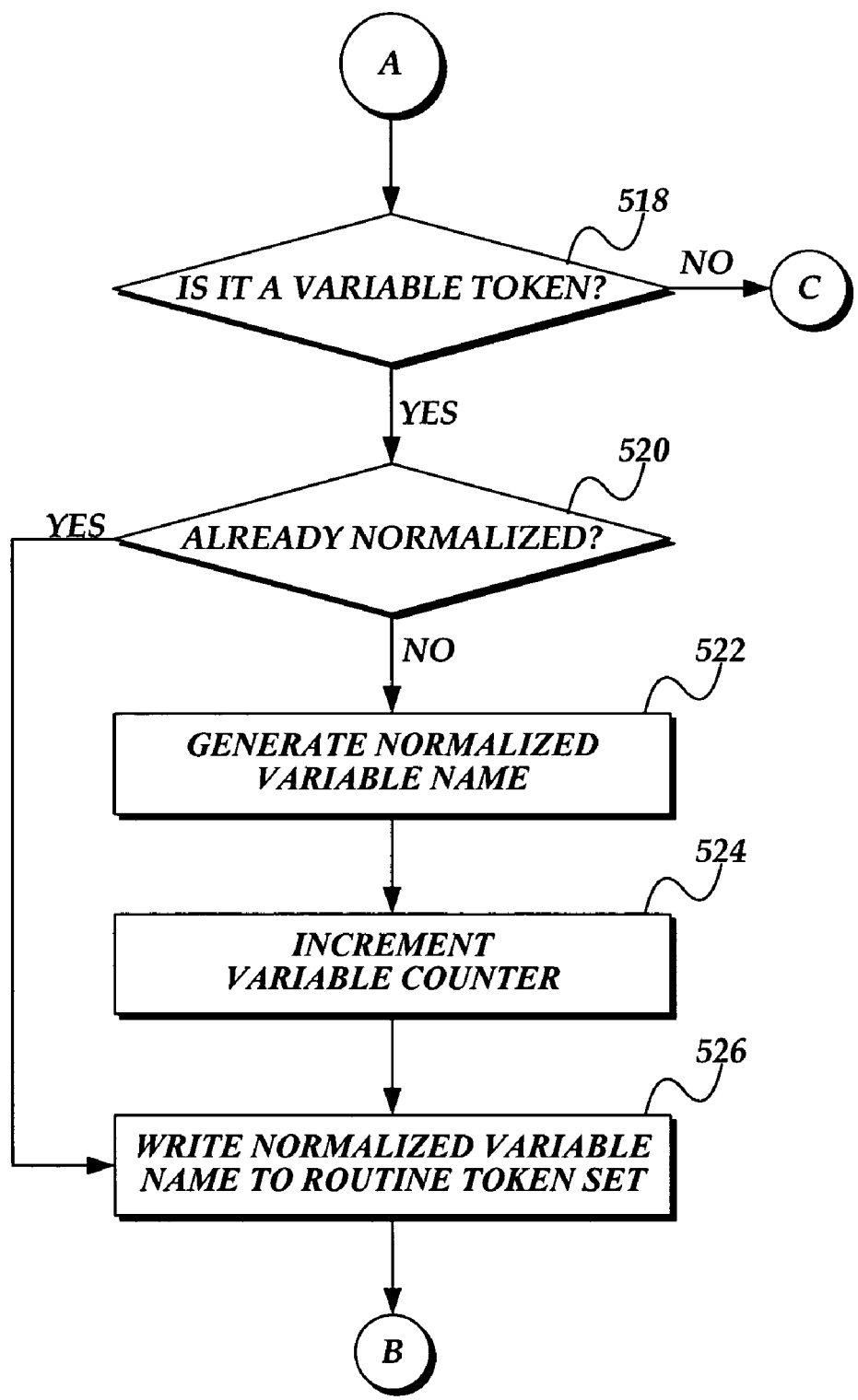
Figure 5C:
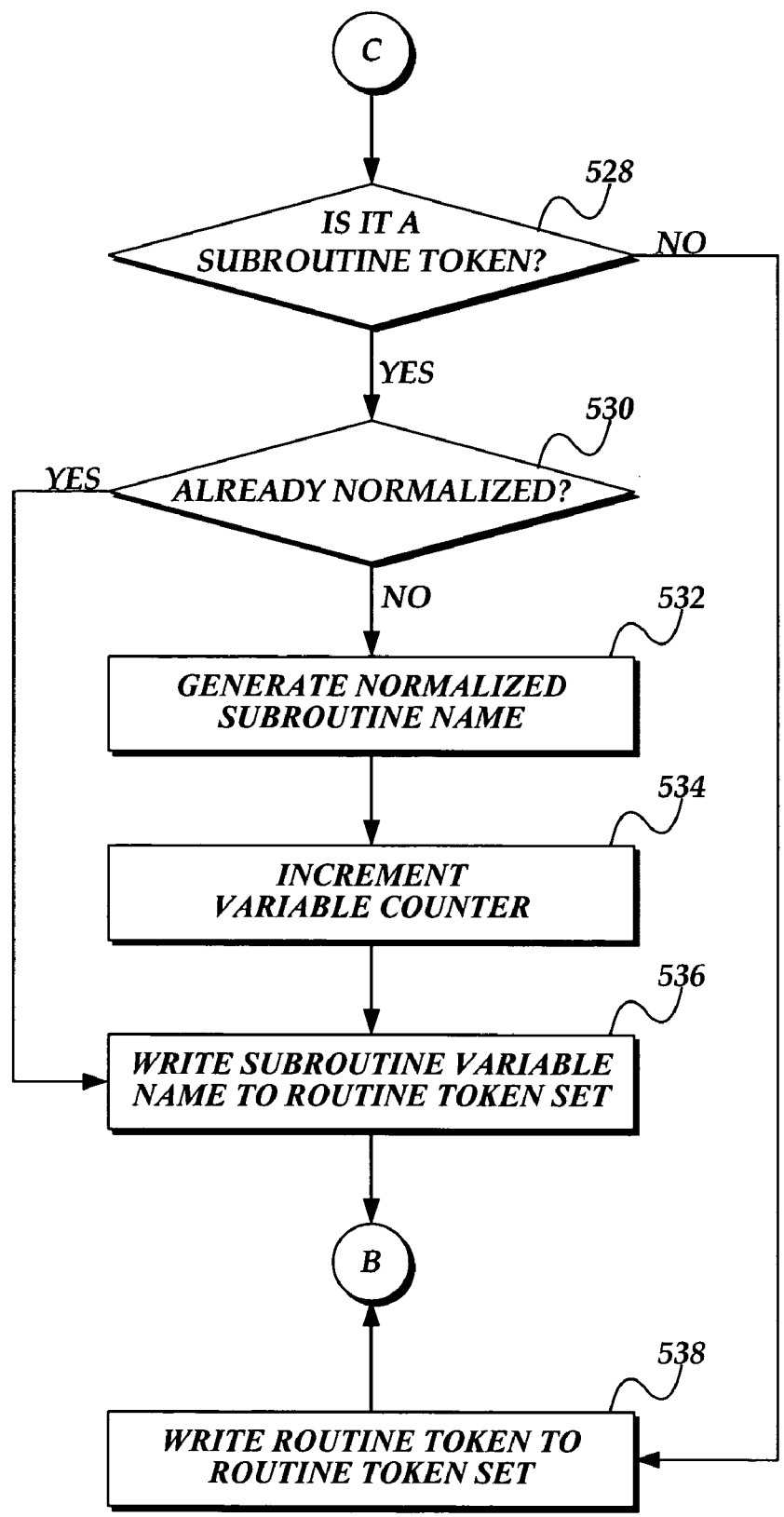

FIGS. 5A, 5B, and 5C illustrate a flow diagram of an exemplary routine 500, suitable for use in the exemplary routine as described above in regard to FIG. 4, for performing a first normalization of a selected routine. Beginning at block 502, a routine token set corresponding to the selected routine is created. At block 504, local counters, one for variables and another for subroutines, are initialized.

At block 506, a first token from the selected routine is obtained. Obtaining tokens from an executable script is well known in the art as parsing, in this case parsing the selected routine. Those skilled in the art will recognize that parsing identifies individual elements from the executable script. The individual elements are hereafter referred to as routine tokens. These routine tokens will comprise tokens of various types, including variables, operators, constants, execution directives, comments, subroutines, white space, and the like.

At block 508, the current routine token is evaluated to determine its type, such as those token types described above. At block 510, a determination is made as to whether the routine token is a type of token that is to be ignored, i.e., one that is unimportant for comparison purposes and, correspondingly, not written to the routine token set. According to one embodiment of the present invention, few routine token types are ignore tokens during the first normalization of the executable script 208. For example, ignore tokens during the first normalization include comment tokens, execution directive tokens, and white space tokens.

If the current routine token is of a type that can be ignored, at decision block 512, a further determination is made as to whether there are any additional routine tokens in the selected routine. If there are additional routine tokens, at block 514, the next routine token is obtained from the selected routine.

Thereafter, the process 500 returns to block 508 where the newly obtained routine token is evaluated.

Returning again to decision block 510, if the current routine token is not of a type that is ignored in this first normalization, the process 500 proceeds to decision block 518. At decision block 518 (FIG. 5B), a determination is made as to whether the routine token is a variable token. If the routine token is a variable token, at decision block 520, a further determination is made as to whether this particular variable token was already normalized. If this variable token has already been normalized, at block 526, the normalized variable name for the variable token is written to the routine token set.

If the variable token has not already been normalized, at block 522, a normalized variable name is generated. Those skilled in the art will recognize that one manner in which a malware executable script may be superficially modified to "fool" anti-virus software is to rename the variables. Renaming the variables, which changes the static appearance of the script, does not functionally alter the executable script. Thus, according to aspects of the present invention, a normalized variable name is generated by combining a standard variable name, such as "V," combined with the value of the variable counter. As such, the first variable encountered while normalizing the selected routine, irrespective of the name of the variable as found in the executable script, is renamed as "V0." Similarly, a second variable encountered in the routine would be named "V1," and so on.

While many variable names may be renamed, those skilled in the art will appreciate that not all variable names may be renamed. In particular, system-supplied variable names, as well as member names of system-supplied data structures, cannot be renamed as they belong to the system, not the executable script. Thus, while system-supplied variable names and data structure members may be technically considered variable names, they do not need to be normalized, as described above, because they cannot be modified between executable scripts, and therefore, can be compared in script signatures without any normalization.

It should be further noted that the above identified naming convention is an exemplary naming convention and that any naming convention may be used, so long as it is applied to both the executable script 208 as well as the known malware whose signatures are stored in the malware signature store 206. Again, the purpose of renaming the variables is to establish a common naming convention between the executable script 208 and the known malware whose script signatures are stored in the malware signature store. Accordingly, the above described naming convention should be viewed as illustrative, and not limiting upon the present invention.

At block 524, the variable counter is incremented in order to distinguish subsequent variable names as they are encountered. At block 526, the normalized variable name is written to the routine token set. Thereafter, the process 500 returns to decision block 512 (FIG. 5A), where a determination is made as to whether there are any more routine tokens in the selected routine to be processed, as described above.

If, at decision block 518, the token is not a variable token, the process 500 proceeds to decision block 528 (FIG. 5C). At decision block 528, a determination is made as to whether the current routine token is a subroutine token. If the routine token is a subroutine token, at block 530, a further determination is made as to whether this particular subroutine token is already normalized. If this subroutine token is already normalized, at block 536, the normalized subroutine name for the subroutine token is written to the routine token set.

If the subroutine token has not already been normalized, at block 532, a normalized subroutine name is generated. Similar to the normalized variable names described above, a normalized subroutine name includes a standard subroutine name, such as "R," combined with the value of the subroutine counter. As an example, the first subroutine call encountered within a selected routine would be normalized to "R1," a second subroutine call would be normalized to "R2," and so on. System-supplied subroutine calls are excluded from normalization for the same reasons, as described above, that system-supplied variable names are excluded.

As with the normalized variable names above, the purpose of renaming the subroutines is to establish a common naming convention between the executable script 208 and known malware script signatures stored in the malware signature store. Accordingly, the above described subroutine naming convention should be viewed as illustrative, and not limiting upon the present invention.

At block 534, the subroutine counter is incremented. At block 536, the normalized subroutine name is written to the routine token set. Thereafter, the process 500 returns to decision block 512 (FIG. 5A), where a determination is made as to whether there are any more routine tokens in the selected routine to be processed, as described above.

If, at decision block 528, the routine token is not a subroutine token, at block 538, the routine token is written to the routine token set. Alternatively (not shown), other processing on the routine token may be made. For example, with respect to script languages that are case insensitive, such as Microsoft Corporation's Visual Basic script language, a routine token may be converted to a predetermined format, such as converting the characters of the routine token to lower case, in order to facilitate subsequent comparisons. Additional forms of processing may also be desirable. After writing the routine token to the routine token set, the process 500 returns again to decision block 512 (FIG. 5A), where a determination is made as to whether there are any additional routine tokens to be processed in the current selected routine. This process 500 continues until, at decision block 512, the determination is made that there are no more routine tokens to be processed in the currently selected routine. Thereafter, at block 516, the routine token set is returned, and the routine terminates.

With reference again to FIG. 4, after normalizing the selected routine, at decision block 408, a determination is made as to whether there are any additional routines in the executable script 208 to be normalized. If there are additional routines in the executable script to be normalized, at block 410, the next routine in the executable script 208 is selected, and the process 400 returns to block 406, where the newly selected routine is normalized. The process 400 continues until, at decision block 408, a determination is made that there are no more routines to be processed in the executable script 208. After determining that there are no more routines to be processed in the executable script 208, at block 412, the script signature is returned to the caller, such as routine 300 (FIGS. 3A-3B), and the routine 400 terminates.

FIGS. 6 and 7 are block diagrams useful for illustrating the first normalization process described above. More particularly, FIG. 6 is a block diagram illustrating an exemplary subroutine segment 600 from an executable script for evaluation by the malware detection system 200. In contrast, FIG. 7 is a block diagram illustrating the exemplary normalized output 700 of the first normalization of the subroutine segment 600.

With reference to both FIGS. 6 and 7, routine token 602 represents a declaration token for allocating variable space for the subsequently identified variables 604, such as vPath, vNames, etc. According to one embodiment of the present invention, a declaration token, such as routine token 602 with its subsequent identifiers, is an ignore token during the first normalization. As such, routine token 602, with its identified variables 604, has no corresponding value in the normalized output 700. Routine token 606 represents a comment token and is also an ignore token during the first normalization, with no corresponding value in the normalized output 700. Routine token 608 represents a variable name token, and, as described above, a normalized variable name is generated and output as normalized token 702.

According to one embodiment of the present invention, a system based subroutine, i.e., those subroutines supplied by the particular script language, such as Visual Basic script language or JavaScript® script language, while they may technically be subroutine calls, are not normalized. Normalization is not needed in this case because a call to a system supplied routine cannot be superficially renamed. As such, a call to a system supplied routine in the executable script 208 may be properly compared to a call to the same routine in a known malware script signature. As illustrated in FIG. 6, routine tokens 610 and 612 represent calls to system supplied subroutines. As such, they are not normalized but are simply written into the normalized output 700 as routine tokens 704 and 706. Similarly, member names of system defined data structures are not normalized, but are simply transferred over to the normalized output 700.

Routine token 614 represents the first non-system supplied subroutine call in the exemplary subroutine segment 600. As such, a normalized subroutine name 708 is written into the normalized output 700. Routine 616 represents a constant value in the exemplary subroutine segment 600. Constant values are written to the normalized output 700 during the first normalization, as indicated by token 710 (FIG. 7).

One manner in which an executable script may be superficially modified without changing the functionality of the script is to add "do-nothing" code. Those skilled in the art will recognize that "do-nothing" code is a code statement that causes the script processor to perform some actions but have no effect on the overall functionality of the executable script. For example, in the exemplary subroutine segment 600, box 618 represents "do-nothing" code, as the variable "vPaths" is not used after its initial assignment. Thus, according to aspects of the present invention, the first normalization may also perform checking to identify "do-nothing" code. When identified, the "do-nothing" code is not written to the normalized script signature. As such, there are no tokens in the normalized output 700 corresponding to the code in box 618.

Figure 8:
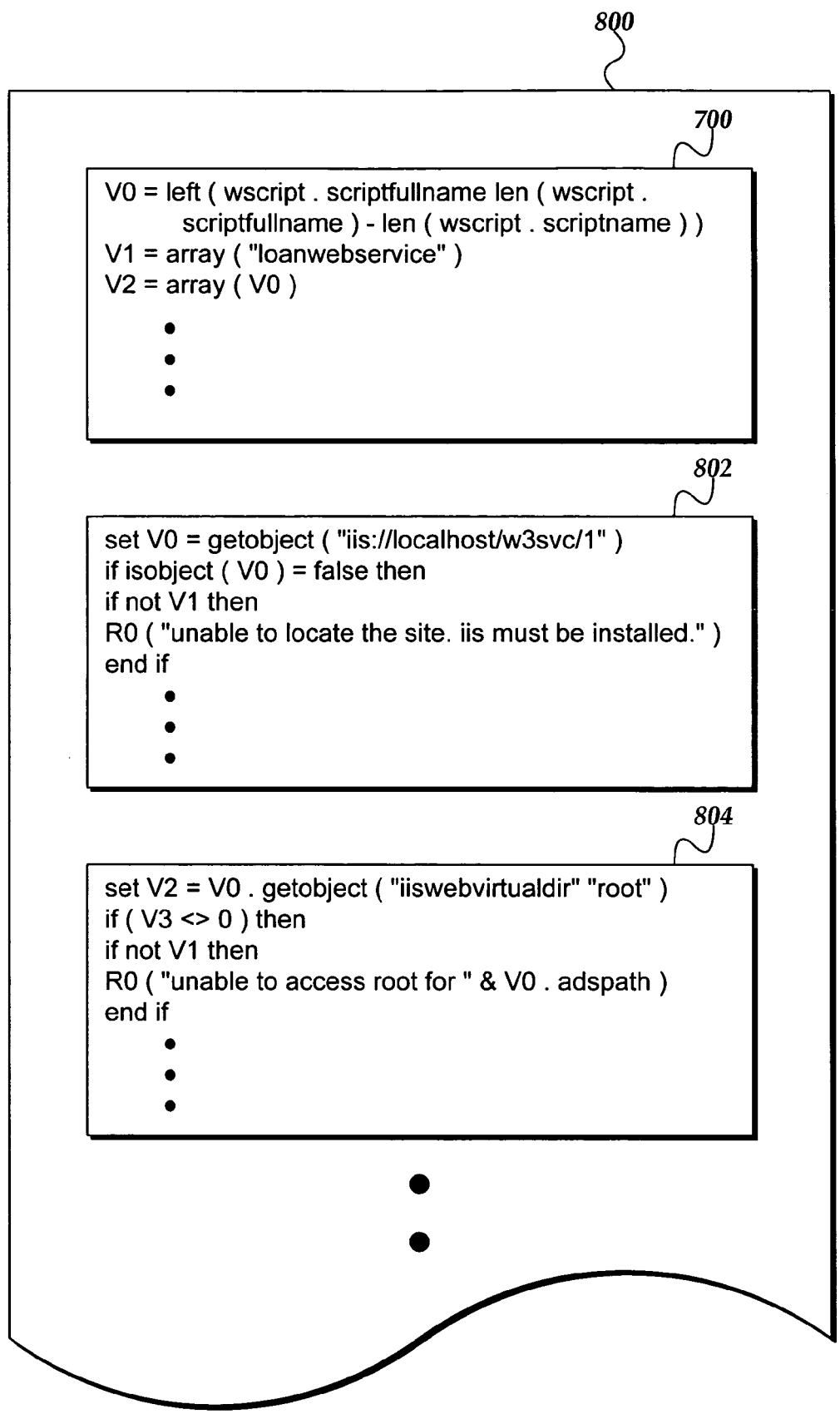
FIG. 8 is a block diagram illustrating an exemplary script signature containing exemplary routine token sets generated by the first normalization pass as described above in regard to FIGS. 5A-5C.

As mentioned above, the script signature 210 generated by the first normalization is a collection of routine token sets. FIG. 8 is a block diagram illustrating an exemplary script signature 800 containing exemplary routine token sets generated during the first normalization as described above in regard to FIGS. 5A-5C. As shown in FIG. 8, the first routine token set correspond to the exemplary normalized output 700 described above. For this example, this exemplary script signature 800 includes at least two other routine token sets, set 802 and set 804.

With reference again to FIG. 3, after having generated a first script signature 210, at block 304, the first script signature is compared to known malware script signatures stored in the malware signature store 206. Script signatures, such as script signature 210, are compared on a routine basis, i.e., the signature comparison module 204 attempts to match routine token sets in the script signature 210 to routine token sets of known malware signature scripts stored in the script signature store 206. According to one embodiment, the order of the routine token sets in a script signature 210 is unimportant.

After comparing the first script signature 210 to the known malware script signatures in the malware signature store 206, at decision block 306, a determination is made as to whether there was a complete match between the first script signature and any of the known malware script signatures. If there was a complete match, at block 308, the malware detection system 200 reports that the script signature 210 matches a known malware signature, indicating that the executable script is malware. Thereafter, the routine 300 terminates.

If there was not complete match between the script signature 210 and the known malware script signatures in the malware signature store 206, at decision block 310, an additional determination is made as to whether there was a partial match between the script signature and any of the known malware script signatures. Those skilled in the art will appreciate that often a discrete portion of a malware script actually performs its destructive process, while other portions of the malware script are not essential for that purpose. Thus, according to one embodiment, a partial match between the script signature 210 and a known malware script signatures may be indicative that the executable script is malware. Accordingly, at decision block 310, if a partial match is made, at block 312, a partial match flag is set. After having set the partial match flag, or if there is no partial match, at block 314, a second script signature is generated. Generating a second script signature corresponding to a second normalization is described below in regard to FIG. 9.

Figure 9:
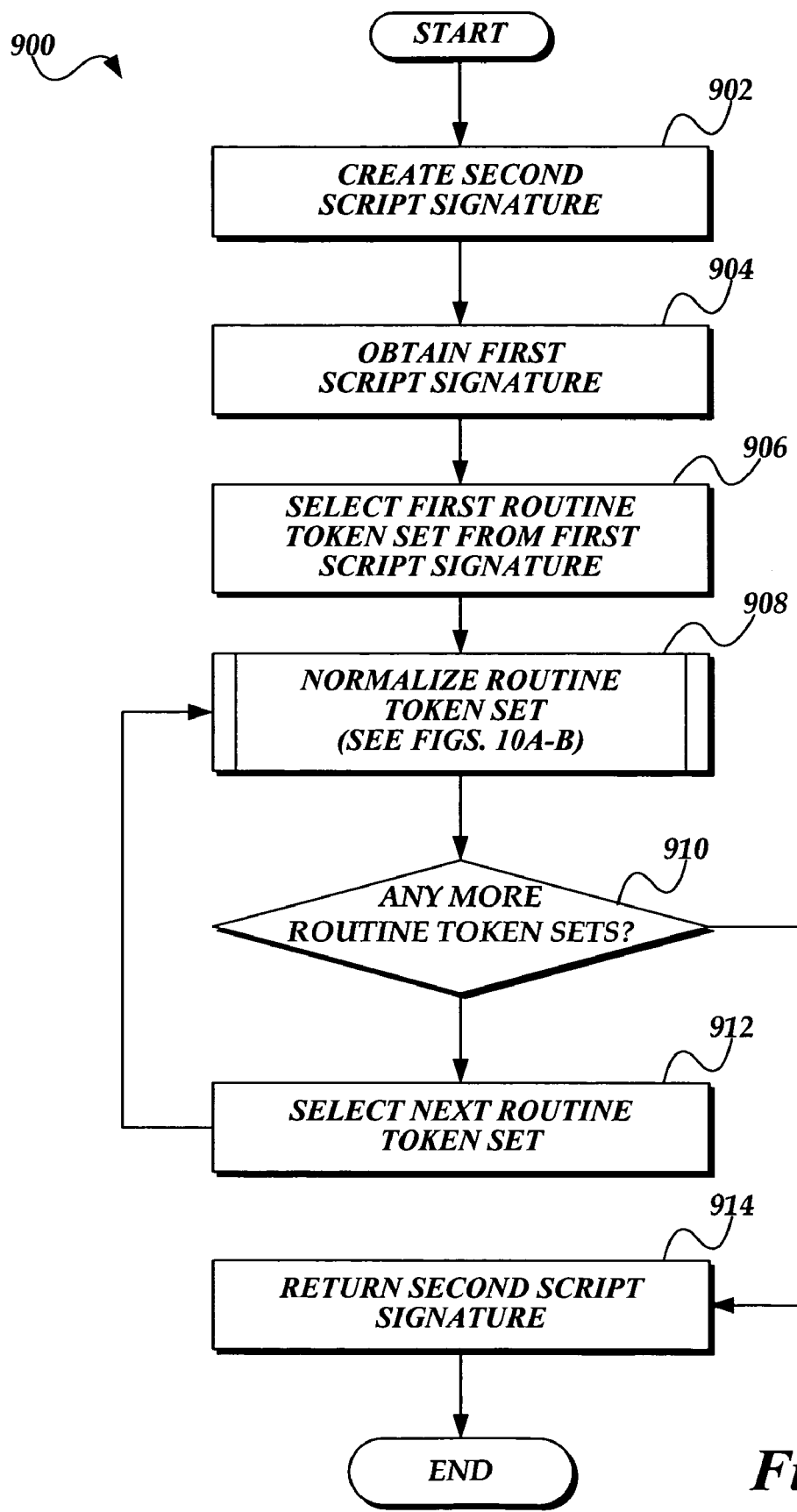
FIG. 9 is a flow diagram illustrating an exemplary routine suitable for use by the exemplary routines of FIGS. 3A and 3B for performing a second normalization on the first script signature.

FIG. 9 is a flow diagram illustrating an exemplary routine 900, suitable for use by the exemplary routine 300 of FIGS. 3A-3B, for generating a second script signature corresponding to a second normalization. According to one embodiment of the present invention, the second normalization is performed by processing the first script signature 210 generated by the first normalization of the executable script 208. Alternatively, the second normalization may be performed by directly processing the executable script 208. While either approach is adequate to generate a second script signature, the following discussion of FIG. 9 will be made in regard to processing the first script signature 210.

Beginning at block 902, a second script signature 212 is created. At block 904, the first script signature 210 is obtained. At block 906, the first routine token set from the first script signature 208 is selected. At block 908, the selected routine token set is normalized, i.e., the second normalization. Normalizing a routine token set is described below in regard to FIGS. 10A and 10B.

Figure 10A:
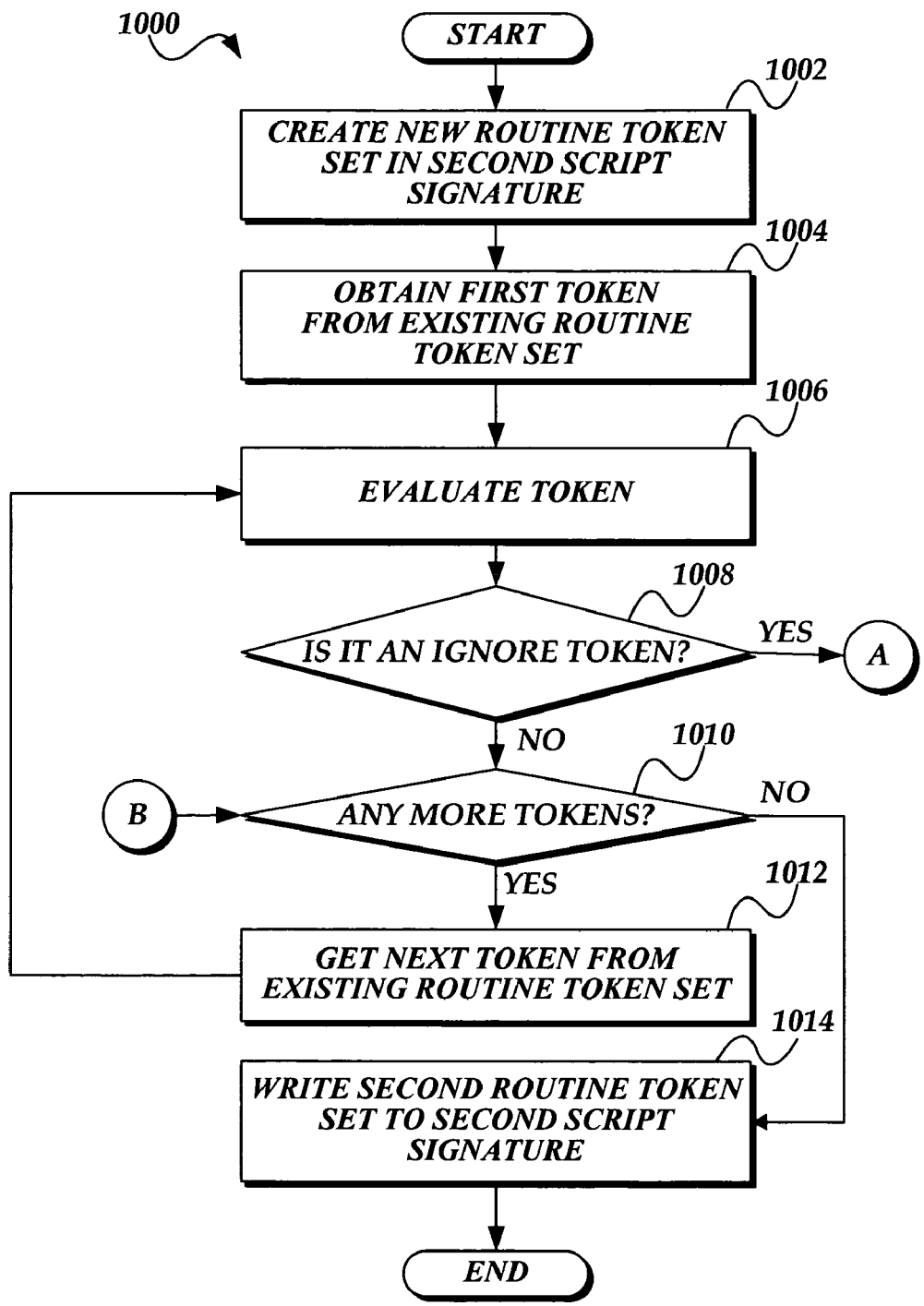
FIGS. 10A and 10B illustrate a flow diagram of an exemplary routine suitable for use in the exemplary routine of FIG. 9 for performing a second normalization of a routine token set from the first script signature.
Figure 10B:
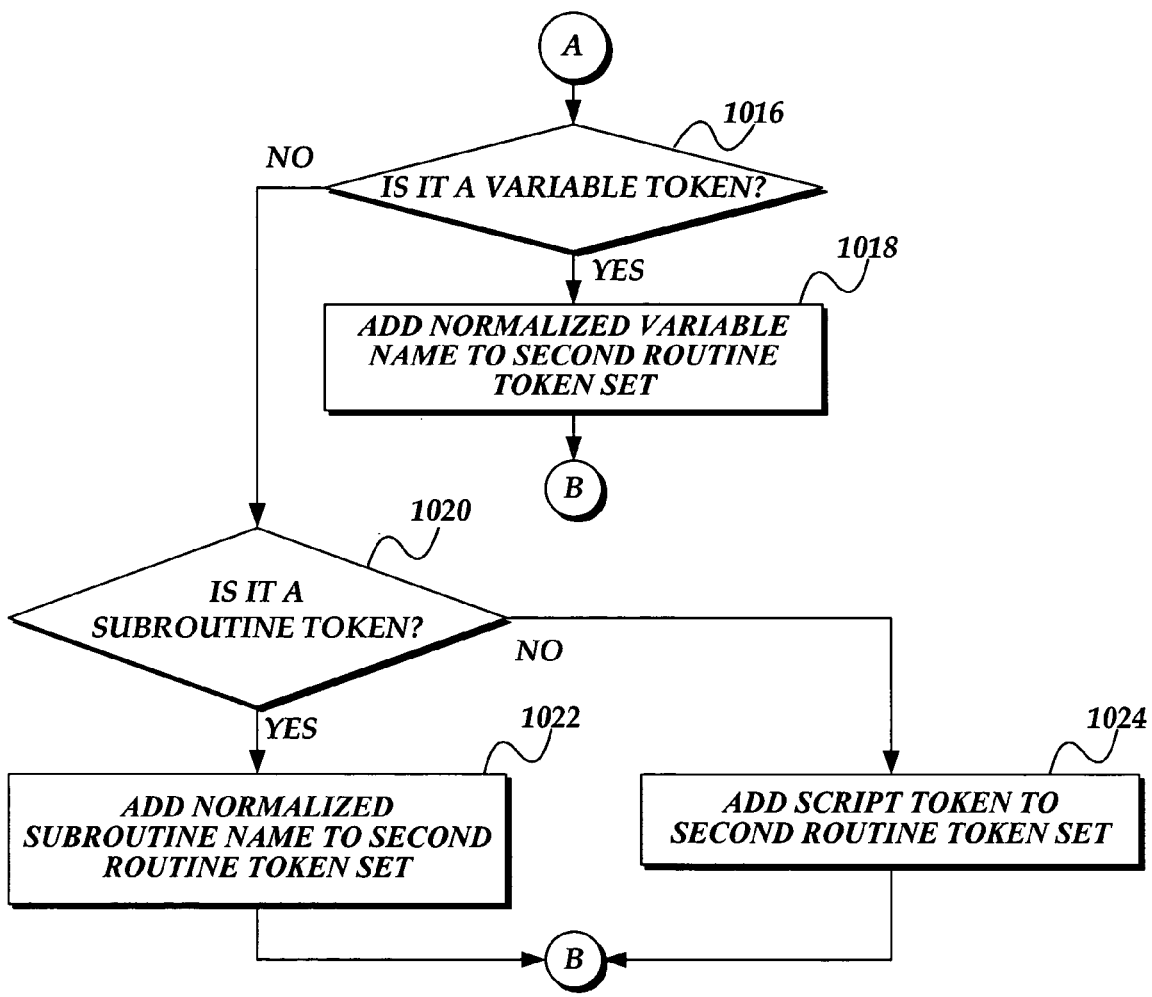

FIGS. 10A and 10B illustrate a flow diagram of an exemplary routine 1000, suitable for use in the exemplary routine 900 of FIG. 9, for normalizing a selected routine token set from the first script signature. For description purposes during the discussion of FIGS. 10A and 10B, the selected routine token set from the first script signature 210 will be referred to as the first routine token set, and a corresponding routine token set for the second script signature 212 will be referred to as the second routine token set.

Beginning at block 1002, a second routine token set for the second script signature 212 is created. At block 1004, the first routine token from the first routine token set is obtained. At block 1006, the obtained routine token is evaluated. Similar to the evaluation in regard to routine 500, this evaluation also determines the obtained routine token's type. However, for this second normalization, variable tokens, subroutine tokens, system supplied structures and member references, operators, and system supplied subroutines are the only routine tokens that are not ignore tokens. As can be seen, other routine tokens which were not ignore tokens in the first normalization are ignore tokens in the second normalization, such as constants and system-defined operators such as "+," "=," and the like. For example, constants are treated as ignore tokens in the second normalization because they are often not determinative of the overall functionality of a script.

At decision block 1008, a determination is made as to whether the obtained routine token is an ignore token, as described above. If the obtained routine token is an ignore token, at decision block 1010, a determination is made as to whether there are any additional routine tokens in the first routine token set. If there are additional routine tokens, at block 1012, the next routine token from the first routine token set is obtained. Thereafter, the process 1000 returns again to block 1006, where the obtained routine token is evaluated, as described above.

If, at decision block 1008, the obtained routine token is not an ignore token, the process 1000 proceeds to decision block 1016. At decision block 1016, a determination is made as to whether the obtained routine token is a variable name token. For purposes of this determination, system supplied variables are not considered a variable name token, as they remain constant between executable scripts, and therefore, can be compared in normalized script signatures, such as script signature 212. If the obtained routine token is a variable token, at block 1018, a normalized variable name is added to the second routine token set. For the second normalization, unlike the first normalization, all variable names are renamed to the same standard variable name. For example, while in the first normalization variable names were consecutively named "V0," "V1," etc., in the second normalization all variable names are simply replaced with a single name, such as "V." After writing the normalize variable name to the second routine token set, the process 1000 proceeds to decision block 1010, to determine whether there are any more routine tokens in the first routine token set, as described above.

If the obtained routine token is not a variable name token, at decision block 1020, a determination is made as to whether the obtained routine token is a subroutine token. As above, this determination excludes any system supplied subroutine calls, which may be easily compared between normalized script signatures. If the obtained token is a subroutine token, at block 1022, a normalized subroutine name is added to the second routine token set. Similar to the variable names described above in regard to block 1018, during the second normalization, a single subroutine name, such as "R," is used as the normalized subroutine name for all subroutine tokens. Thereafter, the process 1000 proceeds to decision block 1010 to process additional routine tokens in the first routine token set.

Those skilled in the art will recognize that quite often, the ordering within a script routine may be altered without affecting the functionality of the script. For example, the equation "v3=v2+v1" is the functional equivalent to "v3=v1+v2." Similarly, the order of subroutine calls is often unimportant to the functionality of a script's routine. Thus, at least one purpose in normalizing all variable names and routine names to a single generic name is to "catch" such superficial modifications to the order of variable names and subroutine calls.

The process 1000 continues as described above until, at decision block 1010, a determination is made that there are no more routine tokens in the first routine token set. Thereafter, the second routine token set is written to the second script signature 212, and the process 1000 terminates.

With reference again to FIG. 9, after having normalized the selected routine token set from the first script signature 210, at decision block 910, a determination is made as to whether there are any additional routine token sets in the first script signature. If there are additional routine token sets, at block 912, the next routine token set is selected, and the process 900 returns again to block 908, where the selected routine token set is normalized. Alternatively, if there are no additional routine token sets in the first script signature 210, at block 914, the second script signature 212 is returned, and the process terminates.

FIG. 11 is a block diagram illustrating an exemplary segment 1100 of a second normalization of the routine token set illustrated in FIG. 7. With reference to FIGS. 7 and 11, variable token "V0" 702 in the first routine token set is normalized to variable token "V" 1102 in the exemplary segment 1100 of a second routine set. Similarly, the subroutine token "R0" 708 in the first routine token set is normalized to subroutine token "R" 1106 in the exemplary segment 1100 of a second routine set. As can also be seen, the system supplied routine token "len" 706 remains the same in the exemplary segment 1100 of a second routine set, as indicated by routine token 1104.

With reference again to FIG. 3B, after having generated the second script signature, i.e., performed the second normalization, at block 316, the second script signature 212 is compared to known malware script signatures in the malware signature store 206. As those skilled in the art will recognize, script signatures generated by the malware detection system 200 must be compared according to the normalization process performed. Thus, script signature 210, being a product of the first normalization, must be compared to known malware script signatures of a first normalization. Similarly, script signature 212, being a product of the second normalization, must be compared to known malware script signatures of a second normalization. According to one embodiment of the present invention, the malware signature store 206 includes script signatures of both types, i.e., of the first normalization and second normalization, for each known malware. Alternatively, as a first normalized script signature may be further normalized to generated a second script signature, the malware signature store 206 may include only a first normalized script signature for each known malware in the malware signature store. For purposes of the subsequent discussion, it will be assumed that the malware signature store 206 includes a second normalized script signature for each known malware in the malware signature store.

At decision block 318, a determination is made as to whether there was a complete match between the second script signature 212 and any corresponding known malware script signatures in the script signature store 206. If there is a complete match, at block 308, the malware detection system 200 reports that the script signature 212 matches a known malware script signature, and the executable script is likely malware. Thereafter, the routine 300 terminates.

Alternatively, if there is not a complete match, a subsequent determination is made at decision block 320, as to whether there was a partial match. If there was not a partial match, at decision block 322, yet a further determination is made as to whether the partial match flag is set, indicating that there was a partial match between the first script signature 210 and corresponding malware script signatures in the script signature store 206. If the partial match flag is set, or if, at decision block 320, there was a partial match between the second script signature 212 and known malware signatures in the malware signature store 206, at block 324, the malware detection system 200 reports that a script signature for the executable script 208 partially matches a known malware script signature, indicating that the executable script is likely to be malware. Thereafter, the routine 300 terminates.

Alternatively, if there was not a partial match at decision block 320 and the partial match flag is not set, at block 326, the malware detection system 200 reports that the script signatures for the executable script 208 do not match any known malware script signatures, and that the malware detection system 200 is unable to determine that the executable script is malware.

While the preferred embodiment of the present invention has been illustrated and described, it will be appreciated that various changes can be made therein without departing from the spirit and scope of the invention. As an example, while the present invention have been described above in terms of operating on an executable script, the same principles may be applied to other executable modules, such as, but not limited to, compiled code or interpretable tokenized files.

The embodiments of the invention in which an exclusive property or privilege is claimed are defined as follows:

1. A computer-implemented malware detection system for determining whether an executable script is malware according to functional variables and subroutines of the executable script, the malware detection system comprising:
   a malware signature store including at least one known malware script signature, wherein each malware signature in the malware signature store is a normalized signature of a known malware script;
   a normalization module that obtains an executable script and generates a normalized signature for the executable script, wherein generating a normalized signature for the executable script comprises normalizing variables and subroutines from the executable script into normalized variables and subroutines conforming to a common format suitable for comparison with that at least one malware signature in the malware signature store, the normalizing comprising renaming variables and subroutines from the executable script according to a common naming convention; and
   a comparison module, wherein the comparison module compares the normalized signature of the executable script to the at least one normalized malware signature in the malware signature store;
   wherein the malware detection system is configured to:
      determine whether the comparison found a complete match between the normalized signature for the executable script and the at least one normalize malware signature, and if so, reporting that the executable script is malware.

2. A computer-implemented method for determining whether a computer-executable script is malware according to functional variables and subroutines of the computer-executable script, the method comprising:
   using one or more processors to perform the following computer-executable acts:
      obtaining an executable script;
      generating a first normalized signature for the executable script, wherein the first normalized signature comprises normalized variables and subroutines normalized from corresponding variables and subroutines in the executable script in a common format suitable for comparison to normalized signatures of known malware, and wherein the normalized variables and subroutines comprise variables and subroutines from the executable script that are renamed according to a common naming convention;
      comparing the first normalized signature to at least one normalized signature of known malware; and
      determining, based on the previous comparison, whether the executable script is malware, comprising determining if the first normalized signature for the executable script is a complete match with a normalized signature of known malware, and if so, reporting that the executable script is malware.

3. A tangible computer-readable medium bearing computer executable instructions which, when executed on a computing device, carry out a method for determining whether a computer-executable script is malware according to functional variables and subroutines of the computer-executable script, comprising:
   obtaining an executable script;
   generating a first normalized signature for the executable script, wherein the first normalized signature comprises normalized variables and subroutines normalized from corresponding functional variables and subroutines in the executable script in a common format suitable for comparison to normalized signatures of known malware, and wherein the normalized variables and subroutines comprise variables and subroutines from the executable script that are renamed according to a common naming convention;
   comparing the first normalized signature to at least one normalized signature of known malware scripts; and
   determining, based on the previous comparison, whether the executable script is malware, comprising determining if the first normalized signature for the executable script is a complete match with a normalized signature of known malware, and if so, reporting that the executable script is malware.

4. The malware detection system of claim 1, wherein comparing the normalized signature of the executable script to the at least one normalized malware signature in the malware signature store further comprises:
   determining whether the comparison found a partial match between the normalized signature for the executable script and the at least one malware signature, and if so:
      generate a second normalized signature for the executable script, wherein generating a second normalized signature comprises normalizing variables and subroutines from the executable script into a second common format suitable for comparison with a second normalized malware signature of known malware in the malware signature store; and
      determine whether the executable script is malware according to a comparison between the second normalized signature and at least one second normalized signature in the malware signature store.

5. The malware detection system of claim 4, wherein normalizing variables and subroutines from the executable script into a second common format suitable for comparison with a second normalized malware signature of known malware in the malware signature store comprises normalizing variables and subroutines of the executable script into a common name according to each variable or subroutine's type.

6. The malware detection system of claim 1, wherein generating a normalized signature for the executable script further comprises generating a set of normalized subroutines for each subroutine in the executable script.

7. The method of claim 2, wherein determining, based on the previous comparison, whether the executable script is malware further comprises:
   determining if the first normalized signature for the executable script is a partial match with a normalized signature of known malware, and if so:
      generating a second normalized malware signature for the executable script, the second normalized signature comprising variables and subroutines from the executable script normalized into a second common format suitable for comparison with second normalized malware signatures of known malware; and comparing the second normalized signature for the executable script to second normalized signatures of known malware to determine whether the second normalized signature for the executable script is a complete match to a second normalized signature of known malware, and if so, reporting that the executable script is malware.

8. The method of claim 7, wherein normalizing variables and subroutines from the executable script into a second common format suitable for comparison with second normalized malware signatures of known malware comprises normalizing variables and subroutines of the executable script into a common name according to each variable or subroutine's type.

9. The method of claim 7 further comprising comparing the second normalized signature for the executable script to second normalized signatures of known malware to determine whether the second normalized signature for the executable script is a partial match to a second normalized signature of known malware, and if so, reporting that the executable script is potential malware.

10. The computer-readable medium of claim 3, wherein determining, based on the previous comparison, whether the executable script is malware further comprises:

determining if the first normalized signature for the executable script is a partial match with a normalized signature of known malware, and if so:

generating a second normalized malware signature for the executable script, the second normalized signature comprising variables and subroutines from the executable script normalized into a second common format suitable for comparison with second normalized malware signatures of known malware; and comparing the second normalized signature for the executable script to second normalized signatures of known malware to determine whether the second normalized signature for the executable script is a complete match to a second normalized signature of known malware, and if so, reporting that the executable script is malware.

11. The computer-readable medium of claim 10, wherein normalizing variables and subroutines from the executable script into a second common format suitable for comparison with second normalized malware signatures of known malware comprises normalizing variables and subroutines of the executable script into a common name according to each variable or subroutine's type.

12. The computer-readable medium of claim 11, wherein the method further comprises comparing the second normalized signature for the executable script to second normalized signatures of known malware to determine whether the second normalized signature for the executable script is a partial match to a second normalized signature of known malware, and if so, reporting that the executable script is potential malware.

13. A computer-implemented method for determining whether a computer-executable script is malware according to functional variables and subroutines of the computer-executable script, the method comprising:

using one or more processors to perform the following computer-executable acts:

obtaining an executable script;

generating a first normalized signature for the executable script, wherein the first normalized signature comprises normalized variables and subroutines normalized from corresponding variables and subroutines in the executable script in a format suitable for comparison to normalized signatures of known malware;

comparing the first normalized signature to at least one normalized signature of known malware; and determining, based on the previous comparison, whether the executable script is malware, comprising:

determining if the first normalized signature for the executable script is a complete match with a normalized signature of known malware, and if so, reporting that the executable script is malware; and determining if the first normalized signature for the executable script is a partial match with a normalized signature of known malware, and if so:

generating a second normalized malware signature for the executable script, the second normalized signature comprising variables and subroutines from the executable script normalized into a second common format suitable for comparison with second normalized malware signatures of known malware; and comparing the second normalized signature for the executable script to second normalized signatures of known malware to determine whether the second normalized signature for the executable script is a complete match to a second normalized signature of known malware, and if so, reporting that the executable script is malware.

14. The method of claim 13, wherein normalizing variables and subroutines from the executable script into a second common format suitable for comparison with second normalized malware signatures of known malware in the malware signature store means comprises normalizing variables and subroutines of the executable script into a common name according to each variable or subroutine's type.

* * * * *